April 9, 1963
R. C. PARRISH
3,084,713
DEVICE FOR BLEEDING OFF A FLUID UNDER PRESSURE
Filed Jan. 27, 1961
2 Sheets-Sheet 1
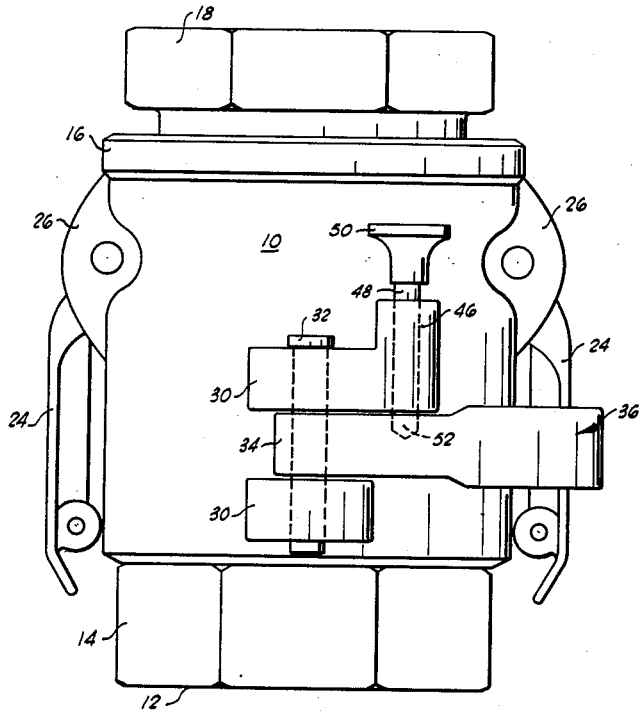
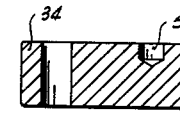
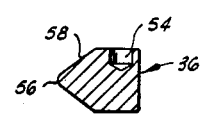
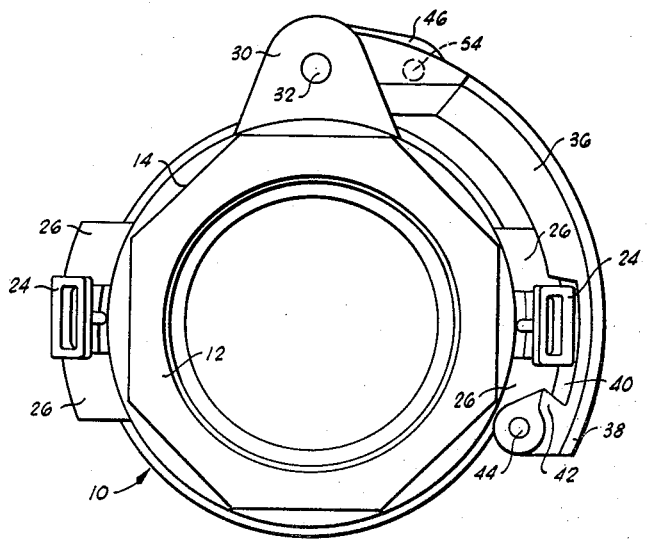
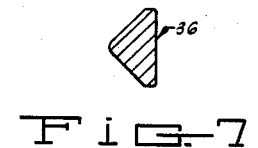
INVENTOR.
REUEL C. PARRISH
BY
Dunlap Laney & Hubbard
ATTORNEYS April 9, 1963
R. C. PARRISH
3,084,713
DEVICE FOR BLEEDING OFF A FLUID UNDER PRESSURE
Filed Jan. 27, 1961
2 Sheets-Sheet 2
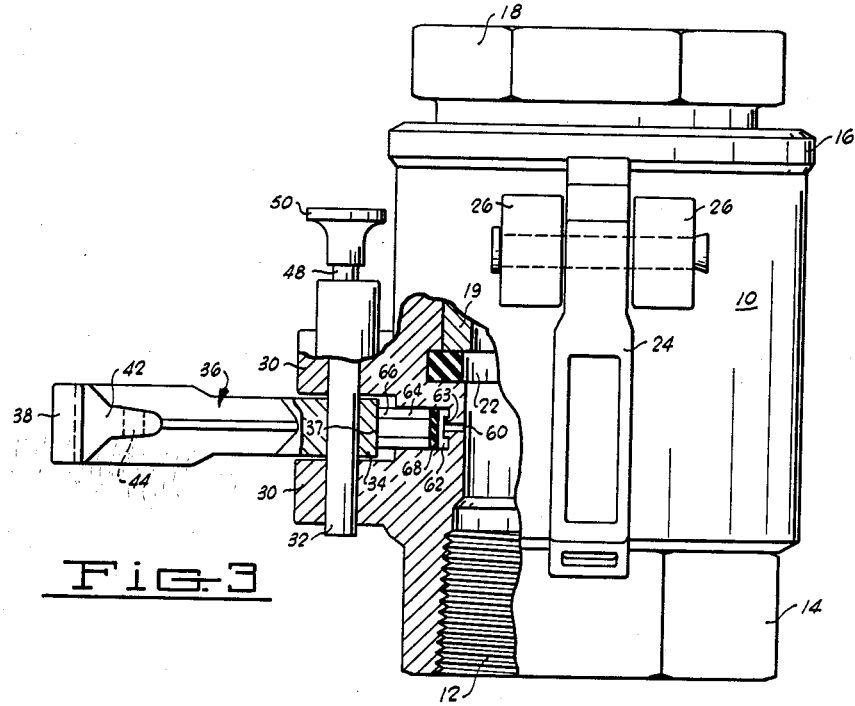
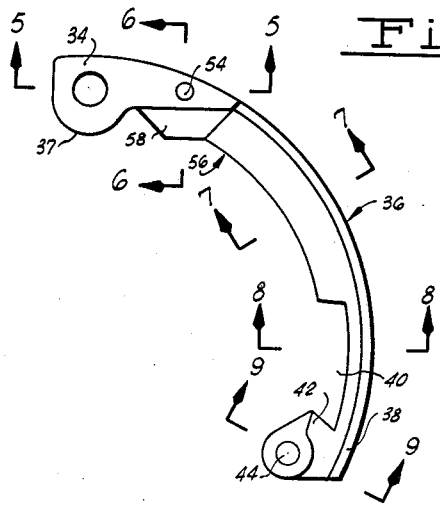
INVENTOR.
REVEL C. PARRISH
BY
Dunlap Laney & Hubbard
ATTORNEYS

United States Patent Office 3,084,713
Patented Apr. 9, 1963

3,084,713
DEVICE FOR BLEEDING OFF A FLUID
UNDER PRESSURE
Reuel C. Parrish, 3005 N. Enid Blvd., Enid, Okla.
Filed Jan. 27, 1961, Ser. No. 85,287
7 Claims. (Cl. 137—583)

This invention relates to devices for controlling the discharge of a fluid under pressure from a container holding said pressurized fluid. More particularly, but not by way of limitation, the present invention relates to a device for bleeding off a fluid under pressure from a tubular fitting containing such fluid.

Many instances exist in modern industry where it is necessary to transfer a fluid under pressure from a container to a point of application of the fluid. It is apparent, of course, that in effecting a transfer of such fluid from one point to another, a conduit system of some type must be provided for the purpose of transmitting the fluid from its source to its destination. Where the source and the destination are movable relatively to the other, it will also be necessary to provide fittings of some type to permit the source of the fluid or the device utilizing the fluid to be coupled to such transmission conduit prior to the release of the pressurized fluid through the conduit. Conversely, following the utilization of the pressurized fluid, the connection through the conduit system to the device utilizing the fluid must be broken before the container supplying the fluid can be removed.

Where the magnitude of the pressure to which the fluid is subjected is great, the equipment, including the conduit system which is to handle the fluid and effect its transfer, becomes increasingly sophisticated. For reasons of economy or safety, it may be highly desirable to provide suitable valves in the conduits carrying the fluid which function to interrupt the flow of fluid through the conduit prior to the disconnection of a coupling downstream from the valve. In such systems, however, there still remains a residual amount of the pressurized fluid in the conduit downstream of the cutoff valve so that the disconnection of the coupling may still allow this residual fluid to escape violently and dangerously at the instant of disconnection. Moreover, the expense of providing such cut-off valves may not be warranted in many applications where it is necessary or desirable to utilize a fluid under pressure and, as a result, such valves are omitted or at least are of a simple design not affording an adequate safeguard against the rapid and violent escape of the fluid from the conduit when the coupling is disconnected.

Typical examples of industrial utilization of pressurized gas are systems depending upon liquified petroleum gas, or so-called "L.P.G.," for their operation. As is well known in the art, L.P.G. is a hydrocarbon fuel which is liquid only under pressure. When the pressure on L.P.G. is reduced, it vaporizes rapidly, and in doing so absorbs a large amount of heat from the surrounding environment. In most of the present-day uses of L.P.G., the liquified fuel is stored in some type of high pressure storage equipment, such as heavy-walled tank trucks, from which it is dispensed through a pipeline or conduit to its point of application. The latter may be a permanent underground storage tank, or, in some instances, the L.P.G. may be discharged directly from the tank truck to the point of utilization as a fuel. It has previously been the practice to provide couplings for connecting the discharge line from the tank truck to the intake line of the storage tank, which couplings may be quickly secured to, or disconnected from, the free ends of the two lines and have thus come to be termed "quick-disconnect" couplings. These quick-disconnect couplings are generally tubular fittings which are provided with an internal annular seat constructed of resilient material and a pair of sealing levers pivotally connected to opposite sides of the coupling and functioning to bias an adapter secured to the end of one of the conduits to be coupled together into sealing contact with the seat inside the coupling. In operation, the coupling is suitably attached, such as by screwing, to the end of one of the conduits and the other end of the coupling is slipped over an adapter secured to the end of the other conduit to be connected to the first conduit. The sealing levers are then pivoted into a position alongside the coupling body to bias the adapter against the resilient seat, thereby establishing a tightly sealed connection between the two conduits.

Although quick-disconnect couplings of the type described have effectively performed their function of enabling the source of a pressurized fluid, such as L.P.G., to be quickly connected and disconnected from the point of application of the fluid, such couplings have frequently been the focal point of serious accidents in which personnel were seriously injured in effecting the disconnection of the conduits carrying the pressurized gas. Such accidents have generally been attributable to the sudden violent escape of the pressurized fluid from the conduits containing it to the surrounding atmosphere at the point of the coupling. As operating personnel have acted to disconnect the coupling by pivoting the sealing levers into their releasing position, such personnel have not taken adequate precautions to protect their faces or other exposed portions of the body from impingement by the escaping fluid. The force of the escaping fluid has been known to cause permanent blindness if it strikes the eyes of the operator, and even damage to the flesh may result if the pressure of the fluid inside the conduits is extremely high. Danger also arises from the force with which the adapter is ejected from the coupling as it is released by pivotation of the levers.

The danger which has previously characterized the use of such quick-disconnect couplings in high pressure fluid systems is, of course, even greater when the fluid under compression is, in itself, a noxious substance. Also, in the case of liquified gases, such as the L.P.G. referred to above, the danger of injury to operating personnel is great even though the pressures to which the gas is subjected are not extremely high, relatively speaking. The enhanced danger characterizing L.P.G. and other systems involving a liquified gas arises from the heat of vaporization characteristic of the substance. Thus, as the escaping L.P.G. expands from the liquid to the gaseous state, it absorbs a tremendous amount of heat from the immediately surrounding environment, and if the gas touches the flesh of the operator as it is escaping from the quick-disconnect coupling, the cellular structure of the skin may be permanently damaged in a manner similar to the damage to tissue which is characteristic of frost-bite.

The present invention broadly comprises a device for safely controlling the discharge of a fluid under pressure from a confined space in which it is contained.

More specifically, the present invention comprises a device for gradually bleeding off pressurized fluid from a tubular fitting containing the fluid. A preferred embodiment of the invention provides an improvement in quick-disconnect couplings of the type hereinbefore described, which improvement facilitates the safe utilization of such couplings without the dangers previously arising from the sudden and violent discharge of pressurized gas from such couplings when they are disconnected. As it is utilized in such quick-disconnect couplings, the invention is characterized by features which prevent the coupling from being inadvertently disconnected or uncoupled without first safely bleeding off the pressure from the coupling. The coupling is also provided with a novel latching element which prevents the bleeding mechanism from being actuated by vibration which is frequently transmitted to the coupling from the apparatus with which it is conjunctively used. Finally, the invention includes a novel bleeder valve for bleeding the high pressure fluid from a tubular fitting, which valve is designed to direct the escaping fluid into scavenging contact with the walls of the passageway through which the fluid makes its escape.

In accordance with the foregoing discussion, it is a broad object of the present invention to provide a device which permits the controlled and safe discharge of a pressurized fluid from a space in which such fluid is contained.

A further object of the present invention is to provide a device for bleeding off fluid under pressure from a quick-disconnect coupling.

Another object of the present invention is to improve presently existing quick-disconnect couplings of the type having a pair of opposed sealing levers functioning to bias an adapter into sealing contact with a seat inside the coupling so that such couplings cannot be disconnected without first safely bleeding off the pressurized fluid contained within the coupling.

An additional object of the present invention is to provide a device for bleeding pressurized fluids from a tubular fitting, which device constantly shields operating personnel from contact with the discharging fluid.

A further object of the present invention is to provide a device for gradually bleeding a fluid under high pressure from a tubular fitting in which such fluid is located, which device is provided with a latching mechanism preventing the inadvertent opening of the device due to its subjection to shocks and vibrational forces.

An additional object of the present invention is to provide a device for bleeding off pressurized fluid from a tubular fitting containing a fluid under pressure, which device is simple in construction, inexpensive to manufacture and characterized by a long and trouble-free operating life.

A better understanding of the foregoing described objects and advantages, as well as a perception of additional objects and advantages, will be obtained by a reading of the following disclosure in conjunction with a perusal of the accompanying drawings which illustrate my invention.

In the drawings:

FIG. 1 is a view in elevation of a quick-disconnect coupling with the device of the present invention incorporated therein.

FIG. 2 is a plan view of the quick-disconnect coupling viewed from the lower end of the coupling as it is illustrated in FIG. 1.

FIG. 3 is a view in elevation of the quick-disconnect coupling with parts of the coupling broken away to more clearly illustrate the manner in which the present invention is incorporated in the coupling.

FIG. 4 is a plan view of the latching lever forming a part of the present invention.

FIG. 5 is a view in section taken along line 5—5 of FIG. 4.

FIG. 6 is a view in section taken along line 6—6 of FIG. 4.

FIG. 7 is a view in section taken along line 7—7 of FIG. 4.

FIG. 8 is a view in section taken along line 8—8 of FIG. 4.

FIG. 9 is a view in section taken along line 9—9 of FIG. 4.

FIG. 10 is a view in elevation of the valve member of the present invention.

FIG. 11 illustrates the valve member shown in FIG. 10 as it appears when viewed from the end.

Referring now to the drawings in detail, and particularly to FIG. 1, reference character 10 designates the tubular body of a quick-disconnect coupling of the type utilized to couple together a pair of tubular conduits carrying a gas under pressure. The tubular body 10 is internally threaded at one of its ends 12 and the threaded end of the coupling is hexagonally or octagonally shaped at its outer periphery as indicated by reference character 14 to facilitate threadedly engaging the coupling with the threaded end of one of the tubular conduits by means of a wrench. At its opposite end 16 the coupling is open and is of a sufficient diametric dimension to receive an adapter 18 of a type commonly used in conjunction with such couplings.

In order to bias the lower end 19 of the adapter 18 into contact with a resilient seat 22 located inside the body 10 of the coupling, a pair of sealing levers 24 are provided on opposite sides of the body 10 and are each pivotally attached to the body by means of a pair of lugs 26 secured thereon. The construction of such sealing levers and the manner in which they function to bias the adapter 18 into sealing contact with the seat 22 are well known in the art. It will therefore be sufficient for the purpose of describing the present invention to state that when the sealing levers 24 are pivoted upwardly from their position shown in FIG. 1 to a position in which they extend substantially normal to the axis of the coupling, the adapter is released from engagement with the coupling, or is disconnected, whereas when the sealing levers 24 occupy the position shown in FIG. 1, the adapter 18 is biased into firm sealing contact with the seat 22 so that pressurized gas may be passed through the coupling without leakage. The construction of the coupling as thus far described is well known in the prior art and forms no part of the present invention except insofar as the elements of the present invention cooperate with elements of the coupling and thus form a novel combination to which a new and unexpected result may be attributed.

Referring again to FIGS. 1 and 2, the body 10 of the coupling is provided with a pair of lugs 30 which are located on the periphery of the body intermediately between the sealing levers 24. It will also be noted that the lugs 30 are positioned in annular alignment with the sealing levers 24, and are thus located closer to the end 12 of the coupling than to its end 16. The lugs 30 may be formed separately from the body 10 of the coupling and secured thereto by welding or brazing, but I prefer to cast the lugs 30 integrally with the body 10 of the coupling in the manner illustrated in FIG. 3. Each of the lugs 30 has an aperture extending therethrough, and the apertures are aligned with each other so that a pivot pin 32 may be passed through both lugs to pivotally secure one end 34 of a curved latching lever 36 between the lugs. The side of the end 34 of latching lever 36 which is adjacent the body 10 of the coupling is radiused to provide a cam surface 37.

With the latching lever 36 pivotally secured to the body 10 of the coupling in this manner, the coupling when viewed from the end 12 appears as it is shown in FIG. 2. The free end 38 of the latching lever 36 may, as shown in FIG. 2, be pivoted to a position in juxta-position to the body 10 of the coupling so that the latching lever extends across one of the sealing levers 24 when the sealing lever is adjacent the body of the coupling in its sealing position. A recess 40 is provided in the latching lever 36 adjacent its free end 38 into which the sealing lever 24 fits when both the sealing lever 24 and latching lever 36 occupy the position shown in FIG. 2. The configuration of the recess 40 and the end 38 of lever 36 are such that a hook portion 42 is formed adjacent the end 38 of the lever 36 for a purpose hereinafter to be described. An aperture 44 is formed in the hook portion 42 so that a finger ring or the like may be inserted through the end 38 of latching lever 36 to facilitate the pivotation of the lever 36 by the use of a single finger.

As is most clearly illustrated in FIG. 1, the lug 30 has formed integrally therewith a generally cylindrical shoulder 46 which is axially bored to accommodate a latching pin 48 of sufficient length to extend through the shoulder 46 and protrude slightly below the side of the shoulder 46 adjacent the latching lever 36. The pin 48 is provided with a wide flat head 50 which allows it to be easily inserted in or removed from the bore through the shoulder 46, and the end 52 of the pin 48 opposite the head 50 is conically tapered to a blunt point. The latching lever 36 is provided with a recess 54 which is positioned to receive the end 52 of pin 48 when the latching lever 36 is in its closed position illustrated in FIGS. 1 and 2. In referring to FIGS. 4 and 6, it will be noted that the latching lever is tapered from the recess 54 toward its leading edge 56 so that as the latching lever 36 is pivoted from the position shown in FIG. 3 to the position which it occupies in FIGS. 1 and 2, the lower end 52 of the latching pin 48 moves across the tapered surface 58 of the latching lever 36 and finally comes to rest in the recess 54.

The novel valve of the present invention which is utilized in conjunction with the latching lever 36 to bleed high pressure fluid from the quick-disconnect coupling is best illustrated in FIG. 3. A small, generally cylindrical orifice 60 communicates at one of its ends with the interior of the coupling and extends for a short distance into the wall of the coupling in a direction normal to the coupling axis. At its other end, the orifice 60 is in communication with a relatively large, cylindrical counterbore 62 which extends from the orifice 60 to the external periphery of the coupling body 10. The counterbore 62 originates at the periphery of the body 10 at a point which is disposed between the lugs 30 and lies beneath the pivoted end 34 of latching lever 36. An annular valve seat 63 surrounds the orifice 60 and defines with the walls of the counterbore 62 an annular groove.

A valve body 64 is disposed with a portion of its length inside the bore 62 and an end portion 66 protruding out of the bore between the lugs 30. The outer periphery of the valve body 64 is hexagonally shaped and is of a size such that the hexagonal cross section lying in a plane extending normal to the axis of the bore 62 would be circumscribed by a circle having exactly the same diameter as the bore 62. By reason of this construction, the valve member 64 defines with the walls of the bore 62 surrounding it six passageways extending parallel to the axis of the counterbore 62. At its end adjacent the orifice 60, the valve body 64 has secured thereto a facing member 68 which is constructed of a suitable resilient material such as rubber. The facing member 68 is hexagonal in configuration and its edges are conterminous with the peripheral faces of the valve body 64.

*Operation*

In the operation of the present invention, the quick-disconnect coupling is first interconnected between the conduits through which the fluid under pressure is to be transmitted. When the coupling is so connected, the sealing levers 24 will be pivoted into the position illustrated in FIG. 1, in which position they extend parallel to the axis of the coupling and flatly abut the periphery of the tubular body 10. With the coupling thus connected, the latching lever 36 is pivoted from its open position as shown in FIG. 3 to a closed position as illustrated in FIG. 2. As the latching lever 36 is pivoted inwardly toward the coupling body 10, the cammed surface 37 of the latching lever adjacent the pivot pin 32 biases the valve body 64 inwardly toward the orifice 60. The resilient facing member 68 is thus forced into contact with the annular seat 63 surrounding the orifice 60 and forms a tight seal with the seat.

Immediately prior to the attainment of the closed position shown in FIG. 2 by the latching lever 36, the tapered surface 58 of the lever is contacted by the lower end 52 of the latching pin 48 and the latching pin is forced upward slightly by the pivotation of the latching lever until the pin is permitted to drop downwardly into the recess 54. As the latching pin 48 engages the recess 54, the latching lever 36 assumes the position shown in FIG. 2 in which it extends across and locks in place one of the sealing levers 24. With both sealing levers 24 and the latching lever 36 thus pivoted to their closed positions, a fluid under pressure may safely be transmitted through the quick-disconnect coupling.

To disconnect the coupling from the conduits following high pressure gas service, the latching pin 48 is first lifted out of the recess 54 so that the latching lever 36 may be pivoted. The latching lever 36 is then pivoted to the open position shown in FIG. 3. The seal between the facing member 68 and seat 63 is thus broken and the gas in the coupling may escape via the orifice 60 and the channels between the faces of the valve body 64 and the walls of the counterbore 62. Since the orifice 60 is of small diameter, the gas does not escape rapidly enough or in sufficiently large volume to constitute a safety hazard. After the pressure of the gas in the coupling has been reduced to a safe level by the escape of gas through the orifice 60, the sealing levers 24 are pivoted to their open position to allow the adapter 18 to be removed from the coupling.

Several important safety features characterize the invention when all of the levers are in their closed positions. First, there is no possibility of disconnecting the coupling without first bleeding off the high pressure fluid contained therein in a safe manner. This possibility is precluded because the sealing lever 24 across which the latching lever 36 extends cannot be pivoted outwardly to its disconnect position without first pivoting the latching lever outwardly from its closed position. The pivotation of the latching lever outwardly will, of course, shift the cammed surface 37 on the valve body 64 so that the valve body is free to move away from the seat 63 under the influence of the pressurized fluid acting through the orifice 60. Thus the pressurized fluid is necessarily first bled from the coupling in sufficient amount to lower the pressure a sufficient extent to permit the coupling to be safely disconnected. Moreover, the "hissing" sound of the gas escaping through the small orifice 60 provides an audible warning signal to anyone about to lift the sealing levers 24.

A second safety feature of the invention is the orientation of the counterbore 62 with respect to the latching lever 36. Since the counterbore 62 is located directly beneath the pivoted end 34 of the latching lever 36, fluid escaping through the orifice 60 and counterbore 62 will impinge upon the cammed surface 37 of the latching lever and its force of ejection will be dissipated in such impingement. The latching lever 36 thus serves as a shield protecting the face or other exposed portions of the operator's body from contact with the gas being bled from the coupling.

Third, it will be apparent from the foregoing discussion that the latching pin 48 assures that the latching lever 36 cannot move from its closed to its open position as a result of vibrational forces and shocks transmitted through the coupling from the machinery with which it is associated. Also, a positive and premeditated act is required to remove the latching pin 48 before pivoting the latching lever 36 to its open position, thus precluding the inadvertent opening of the bleeder valve by careless operating personnel.

An additional feature of the invention which enables it to function efficiently over long operating periods under adverse conditions of cleanliness is the type of valve body 64 utilized in the cylindrical counterbore 62. By virtue of the hexagonal peripheral surface of the valve body 64, the escaping gas is channelled into contact with the wall of the counterbore 62 so that the counterbore is scavenged by the passing gas. This scavenging action prevents the counterbore 62 and orifice 60 from becoming clogged or fouled with dirt or foreign matter.

From the foregoing description, it will be apparent that the present invention provides a device which functions effectively to permit fluid under pressure to be bled off or discharged in a controlled and safe manner from a tubular coupling in which it is located. The device is simply and inexpensively constructed and is self-cleaning so that it does not require maintenance over long periods of time. It is particularly well adapted for use in conjunction with a quick-disconnect coupling, cooperating with certain elements of the coupling to improve the degree of safety with which such couplings may be used.

Those skilled in the art will readily visualize certain changes and modifications which may be made in the form and construction of the invention. For example, it might be desirable under some circumstances to use a valve body having more or less than six faces extending parallel to the axis of the counterbore, or it might be desirable to alter the shape of the latching lever in adapting the invention to use upon other types of structures containing a gas under pressure. Insofar as these changes are those which readily occur to one skilled in the art as the most suitable to meet the needs of a particular situation with the principles of the present invention, they are deemed to be a part of the invention coming within the scope of the appended claims.

I claim:

1. In a quick-disconnect tubular fitting of the type having a pair of sealing levers pivotally attached to the side of the fitting and functioning to bias an adaptor into sealing contact with a seat inside the fitting, the improvement which comprises a wall portion of said fitting having a capillary orifice communicating with the interior of said fitting, and further having a cylindrical counterbore of larger diameter than said orifice communicating at its inner end with said orifice and at its outer end with the atmosphere around said fitting; a valve body movably mounted in said counterbore and adapted to seal said orifice, said valve body defining with the wall of said counterbore a passageway bypassing said valve body; means secured to the outer surface of said wall portion for biasing said valve body into sealing position over said orifice; latching means for retaining said biasing means in its valve closing position, said means for biasing said valve body into sealing contact with said valve seat comprising a latching lever pivotally secured at one of its ends to said wall portion and having a cammed surface thereon cooperating with the upper end of said valve body to urge said valve body toward said orifice when said lever is pivoted, said latching lever being secured to said wall portion at a position spaced from one of said sealing levers by a distance slightly less than the length of said latching lever, said latching lever pivoting in a plane extending normal to said sealing lever; and said latching lever including a hook portion at the end thereof opposite said pivotally secured end adapted to engage said one sealing lever to prevent said sealing lever from being pivoted from its closed to its open position without first opening said valve.

2. In a quick-disconnect tubular fitting of the type having a pair of sealing levers pivotally attached to the side of the fitting and functioning to bias an adaptor into sealing contact with a seat inside the fitting, the improvement which comprises orifice means extending through a wall portion of said fitting for bleeding pressurized fluid from the inside of said fitting to the atmosphere outside said fitting; valve means in said orifice means operative to open and close said orifice means upon actuation of said valve means; a pair of apertured lugs on the outer periphery of said fitting on opposite sides of said orifice means, said lugs having their apertures aligned in a plane extending parallel to the axis of said tubular fitting; a pivot pin extending through said apertures; an arcuate lever arm pivotally journaled at one of its ends on said pivot pin and extending around a portion of the periphery of said fitting and across one of said sealing levers when said one sealing lever is in its closed position in juxtaposition to the outer surface of said fitting and when arcuate lever is pivoted into juxtaposition to the outer periphery of said fitting; a cammed surface on said arcuate lever adjacent said one end and cooperating with said valve means upon pivotation of said arcuate lever to bias said valve means to the closed position in said orifice means, said cammed surface extending over said orifice means to intersect the projected axis of said orifice means whereby the fluid discharged through said orifice means strikes said cammed surface; a hook at the other end of said arcuate lever adapted to engage said one sealing lever when said arcuate lever is in its valve closing position and said one sealing lever is pivoted from its fitting connecting position toward its fitting disconnecting position; and means for latching said arcuate lever in its valve closing position.

3. A quick-disconnect fitting as claimed in claim 2 wherein said lever is provided with a recess in one surface thereof, and wherein said means for latching said arcuate lever in its valve closing position comprises an apertured shoulder on the outer periphery of said tubular fitting positioned to register said aperture with said recess in said arcuate lever when said lever is in its valve closing position; and a latching pin of sufficient length to extend through said aperture into said recess when said aperture and recess are in registration.

4. A quick-disconnect fitting comprising a tubular body having an internal, circumferential seat therein for engaging a male adaptor fitting; at least one sealing lever pivotally attached to the side of said tubular body and pivoting in a plane containing the axis of said tubular body to bias said adaptor into sealing engagement with said seat; a bleed valve in said tubular body for bleeding a fluid under pressure from said tubular body; a latching lever pivotally secured to the side of said body and operative to open and close said bleed valve upon pivotation of said latching lever in a plane extending normal to the axis of said tubular body, said latching lever having a hook portion thereon adapted to engage said sealing lever to prevent said sealing lever from being pivoted from its adaptor biasing to its adaptor releasing position without first opening said bleed valve by pivotation of said latching lever.

5. A quick-disconnect fitting as claimed in claim 4 and further characterized to include latching means for retaining said latching lever hook portion engaged with said sealing lever and positioned to close said bleed valve.

6. A quick-disconnect fitting as claimed in claim 4 wherein said bleed valve includes a valve body movably mounted in a radial passageway extending through said valve body and operative to open and close said passageway; said quick-disconnect fitting being further characterized to include a cam surface on said latching lever cooperating with said valve body to bias said valve body to a closed position upon pivotation of said latching lever to engage said hook portion with said sealing lever.

7. A quick-disconnect fitting as claimed in claim 6 wherein the cam surface on said latching lever intersects the projected axis of, and overlies, said radial pasageway in all positions to which said latching lever may be pivoted whereby the fluid discharged through said passageway is deflected by said cammed surface.

(References on following page)

References Cited in the file of this patent
UNITED STATES PATENTS

| | | |
|---|---|---|
| 857,915 | Woody | June 25, 1907 |
| 870,113 | Lewis | Nov. 5, 1907 |
| 941,652 | Rock | Nov. 30, 1909 |
| 1,027,061 | Norling | May 21, 1912 |
| 2,034,216 | Stout | Mar. 17, 1936 |
| 2,162,096 | Marmorek | June 13, 1939 |
| 2,410,105 | Remus | Oct. 29, 1946 |
| 2,597,478 | Hammon | May 20, 1952 |
| 2,715,512 | Miller | Aug. 16, 1955 |
| 2,732,166 | Rayner | Jan. 24, 1956 |
| 2,873,941 | Kortchmar | Feb. 17, 1959 |
| 2,877,979 | Snyder | Mar. 17, 1959 |